A. C. BURLINGAME.
GRIPPING TONGS.
APPLICATION FILED APR. 12, 1919.

1,321,594.

Patented Nov. 11, 1919.

Inventor
Albert C. Burlingame,
By Watson E. Coleman
Attorney

UNITED STATES PATENT OFFICE.

ALBERT C. BURLINGAME, OF MINNEAPOLIS, MINNESOTA.

GRIPPING-TONGS.

1,321,594. Specification of Letters Patent. Patented Nov. 11, 1919.

Application filed April 12, 1919. Serial No. 289,598.

*To all whom it may concern:*

Be it known that I, ALBERT C. BURLINGAME, a citizen of the United States, residing at Minneapolis, in the county of Hennepin and State of Minnesota, have invented certain new and useful Improvements in Gripping-Tongs, of which the following is a specification, reference being had to the accompanying drawings.

This invention relates to a pair of gripping tongs, for picking up and holding various articles.

The invention aims to provide a pair of gripping tongs, for holding or gripping meats while broiling, or holding vegetables, or for holding dishcloths when washing dishes in hot water, and particularly adapted for washing fruit jars, lamp chimneys, spittoons, etc.

The invention further aims to provide a pair of tongs for picking up hot coals, cinders, small pieces of ice, and may also be used for holding a slice of bread or a slice of cheese over the fire for toasting the same, and also for extracting pickles and the like from deep jars, or for lifting the ears of corn or dumplings, and may also be utilized for picking up bolts, nuts and other articles, in fact for handling any small article. Also, the device may be adapted to hold a greased cloth for greasing the pan for cooking griddle cakes. Furthermore, as illustrated in the drawings, this improved pair of grappling tongs may be employed for extracting corks, in fact there is hardly any limit as to the various uses, capable of being performed by this improved pair of tongs.

More specifically speaking, the invention aims to provide a pair of grappling tongs consisting of a pair of spring jaws, one including an elongated loop, through which the other jaw is movable, and which other jaw is provided with an offset extension, the extremity of which is curved and overlies the loop end of the loop jaw, the jaws including yieldable urging means to urge the jaws together.

While, the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 1:
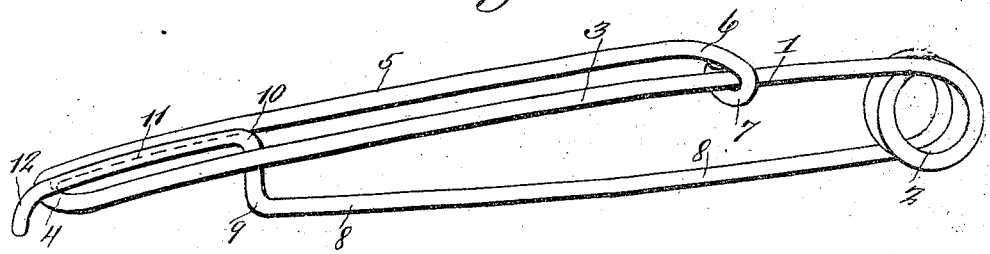
Figure 1 is a view in perspective of the improved pair of grappling tongs constructed in accordance with the invention.
Figure 2:
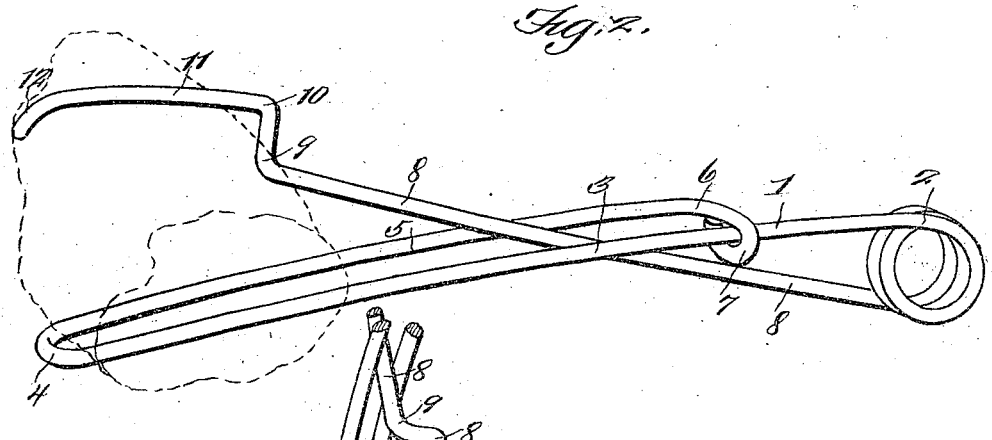
Fig. 2 is a perspective view showing the jaws open.
Figure 4:
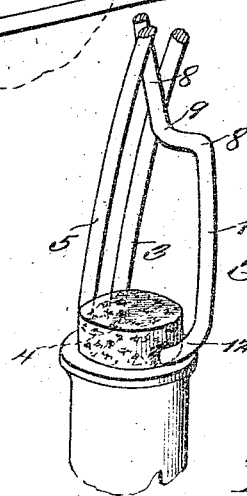
Fig. 4 is a perspective view showing the jaws employed for extracting a partially drawn cork from a different kind of bottle than that shown in Fig. 3.
Figure 3:
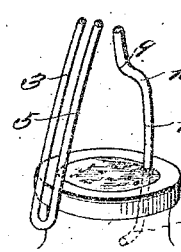
Fig. 3 is a view illustrating one of the jaws being employed for extracting a cork from a water bottle.

Referring to the drawings 1 designates the grappling tong as a whole, and which is constructed from a single length of spring wire, a portion of which at a suitable location intermediate the ends of the wire being formed into a coil 2, the several convolutions of which constitute spring means for the jaws of the tongs. The end portion 3 of the wire beyond the coil is bent upon itself as at 4 to form a loop, and the side 5 of this loop is arranged substantially in parallelism to the extended part 3, and the end portion of the side 5 is bent at 6 and turned into an eye 7, through which the extended portion 3 engages. In this manner the extended part 3 constitutes a loop grappling jaw or tong. The part 8 beyond the coil 2 constitutes the other jaw or tong. This tong or jaw is bent at 9 and 10, thereby providing an offset jaw portion 11, the extremity of which is curved as shown at 12. It is to be noted that the jaw 8 is operable through the loop jaw, and owing to the spring action of the several convolutions of the coil 2, the opposing jaws are urged yieldably toward each other. It is to be noted that the jaw 8 is a trifle longer than the loop jaw, whereby the curved extremity of the off-set portion 11 of the jaw 8 may overlap the loop end 4 of the jaw 3. The loop of the jaw 3 acts as a guide for the jaw or tong 8, when pressure is applied on the jaws at a point to the rear of the eye 7, the two jaws may be opened, thereby permitting them to grip or clamp an article, whereby it may be picked up or extracted from a receptacle. An article of any kind, such as indicated in dotted lines in Fig. 2, or an article of any other shape may engage between the jaws. In order to utilize the device for extracting corks, it may be noted that the extremity of the part 11 of the jaw 8 may be inserted or forced between the inner surface of the neck of a water bottle or similar bottle and the cork, then the jaw twisted, and the cork extracted, as shown in Fig. 3. After a cork has been partially withdrawn, such as shown in Fig. 4, the end portions of the two jaws may engage the cork as shown, whereby the cork may be entirely withdrawn. It is to be noted that the lateral eye 7, through which the jaw 3 engages, constitutes an abutment against which the jaw 8 contacts, thereby limiting the jaws in their open positions. That portion of the jaws nearest the coil, and also the coil constitutes a handle, whereby the jaws of the implement may be opened or closed, by pressing the parts 3 and 8 toward each other, that is against the spring action of the coil.

When extracting corks from bottles in a manner either as shown in Fig. 3 or as shown in Fig. 4, the jaws of the tong are gripped firmly in the hand at a point near the neck of the bottle, so as to clamp the cork, and then extract it. In accomplishing this operation in Fig. 4, it is obvious that the loop jaw engages on the outside of the neck of the bottle, but nevertheless the cork may be gripped between the other jaw and the inner surface of the neck of the bottle. As the cork is withdrawn from the bottle in the manner shown in Fig. 4, the loop jaw, after the cork has disengaged from the mouth end of the bottle, will be forced quickly against the cork.

The invention having been set forth, what is claimed as new and useful is:

1. A pair of grappling tongs constructed from a single length of spring wire, comprising a spring coil constructed at a suitable location between the ends of the wire, one end of the wire beyond said coil having an elongated loop, the other end of the wire beyond the coil being operable through the loop, the rear end of the loop having an abutment part to be engaged by the jaw movable through the loop, to limit the jaws in their open position, the jar which operates through the loop having an offset extension, the extremity of which overlies the loop end of the loop jaw.

2. A pair of grappling tongs constructed from a single length of spring wire, said wire at a suitable point between its ends being bent to form a spring coil comprising several convolutions, one end of the wire beyond the coil being extended, bent upon itself to form a loop jaw, the side of the loop beyond the bend being extended toward the coil and bent to form an eye at a point a distance from the coil of substantially one-fourth the length of the jaw, the other end of the wire beyond the coil being operable through the loop jaw and constituting an opposing jaw, the end of the last mentioned jaw having an extension offset from the body of the jaw, the extremity of this extension being curved and overlying the bend of the loop jaw, said laterally extending eye constituting an abutment to limit the last mentioned jaw in its movement through the loop jaw, that is in an open position.

In testimony whereof I hereunto affix my signature in the presence of two witnesses.

ALBERT C. BURLINGAME.

Witnesses:
S. P. McELMERL,
E. B. CUTTER.